Patented May 6, 1952

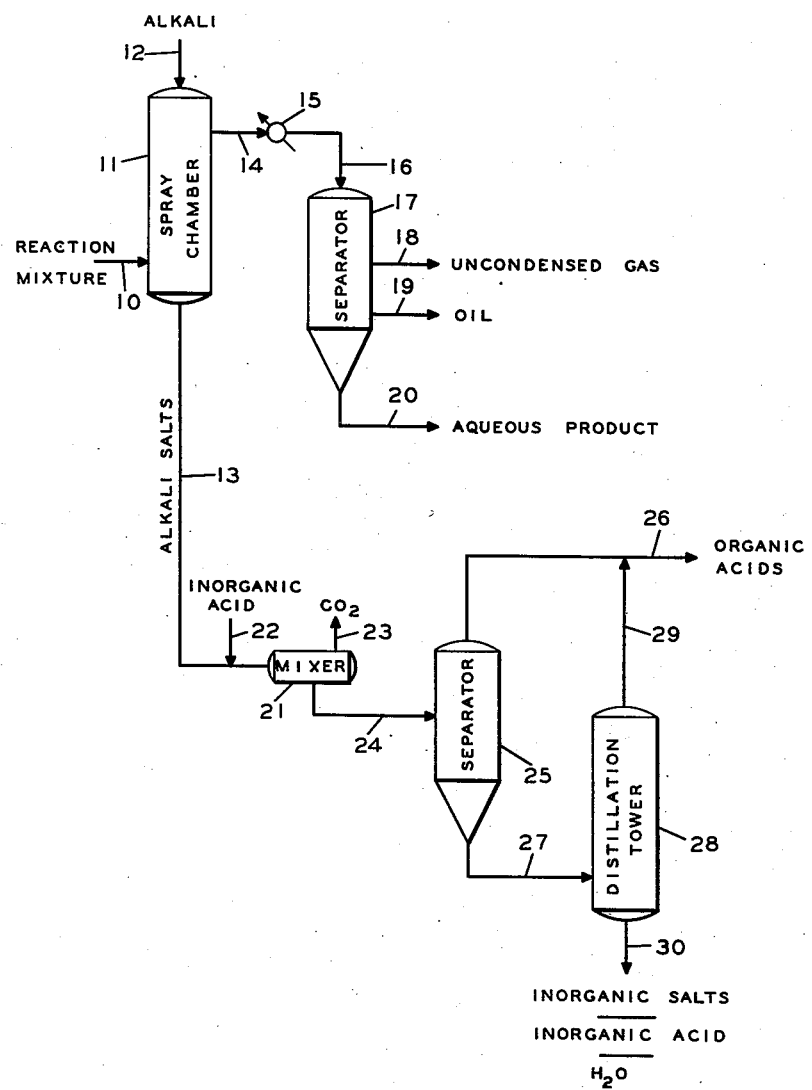

2,595,223

UNITED STATES PATENT OFFICE 2,595,223

SEPARATION OF ORGANIC COMPOUNDS

William P. Burton, Orange, and Ernest Solomon, Nutley, N. J., assignors to The M. W. Kellogg Company, Jersey City, N. J., a corporation of Delaware Application May 28, 1947, Serial No. 751,072

8 Claims. (Cl. 260—450)

This invention relates to the separation of organic compounds and relates more particularly to the separation of organic acids from mixtures thereof with other oxygenated organic compounds and hydrocarbons. Still more particularly, the invention relates to a process for the separation of organic acids from mixtures thereof with other oxygenated organic compounds and hydrocarbons present in the reaction product obtained in the catalytic hydrogenation of oxides of carbon at elevated temperatures.

In the catalytic hydrogenation of oxides of carbon at elevated temperatures a reaction product is obtained in the vapor state, as reactor outlet gases, at temperatures falling between about 300° F. to about 700° F. and containing hydrocarbons, water vapor, and oxygenated organic compounds which comprise fatty acids, alcohols, aldehydes, ketones and esters. These gases may be passed through one or more condensation zones in which they are cooled to temperatures within the range from about 40° F. to about 150° F. The resulting condensate then separates into an aqueous phase and an oil phase. Both phases contain water-soluble and water-insoluble fatty organic acids in admixture with other oxygenated organic compounds, acids of lower molecular weight tending to remain in the aqueous phase and acids of higher molecular weight tending to remain in the oil or non-aqueous liquid phase. The relatively large quantities of aqueous water-soluble fatty organic acids present in the water phase may be next extracted from the aqueous solution by solvent extraction methods, and the solvent subsequently recovered from the resulting extract.

The recovery of solvent from the aforementioned extract has proved costly in the past. Such procedure has been found to be particularly disadvantageous where water-soluble fatty organic acids are present in dilute aqueous solution in the aforementioned aqueous phase, inasmuch as in such instances the ratio of solvent used to acids extracted is large, making it necessary to distill large amounts of solvent per unit of acids recovered and has therefore been found undesirable from an economic standpoint.

The present invention is directed to a process, as more fully hereinafter described, for the separation of fatty organic acids from other oxygenated organic compounds and hydrocarbons present in the aforementioned reaction product, obtained in the vapor state in the aforementioned catalytic hydrogenation of oxides of carbon at elevated temperatures, wherein these acids are removed from the vaporized reaction mixture before subsequent condensation of normally liquid products is effected. In general, the process comprises the steps of subjecting the aforementioned reaction mixture in the vapor state, to scrubbing treatment with a strong alkali at a temperature above the point of condensation of normally liquid components present in the mixture, acidifying the resulting alkali salts of fatty organic acids with an inorganic acid, separating the resulting mixture into an acid-rich phase comprising any water-insoluble organic acids that may be present and a water-rich phase comprising inorganic salts and water-soluble organic acids, and separating the water-soluble acids from inorganic salts present in the aforementioned water-rich phase. The acid-free gas obtained in the aforementioned scrubbing treatment, is separately cooled and separated into an uncondensed gas phase comprising relatively light hydrocarbons, a condensed oil phase comprising a major proportion of oxygenated organic compounds of relatively high molecular weight and an aqueous phase comprising substantially all of the remainder of the oxygenated organic compounds having a relatively low molecular weight.

It is, therefore, an object of the present invention to provide an improved process for the separation of organic acids from mixtures thereof with other oxygenated organic compounds and hydrocarbons.

Another object of the invention is to provide an improved process for the separation of fatty organic acids from mixtures thereof with other oxygenated organic compounds and hydrocarbons present in the reaction product obtained in the catalytic hydrogenation of oxides of carbon at elevated temperatures.

Still another object of the invention is to provide an improved process for the separation of fatty organic acids from mixtures thereof with alcohols, aldehydes, ketones, esters and hydrocarbons present in the reaction product obtained in the catalytic hydrogenation of oxides of carbon at elevated temperatures.

Other objects and advantages inherent in the invention, will be apparent from the following more detailed disclosure.

The accompanying drawing illustrates, diagrammatically, one form of the apparatus employed and capable of carrying out one embodiment of the process of this invention. While the invention will be described in detail by reference to one embodiment of the process employing the apparatus illustrated in the drawing, it should be noted that it is not intended that the invention be limited to the embodiment as illustrated, but is capable of other embodiments beyond the scope of the apparatus illustrated in the drawing.

Pumps, compressors, valves and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, the product of the reaction of an oxide of carbon and hydrogen, containing a mixture of hydrocarbons and oxygenated organic compounds which comprise fatty organic acids, alcohols, aldehydes, ketones and esters, is supplied through line 10. This product is in the vapor state substantially as it comes from the reaction vessel at temperatures varying between approximately 300° F. to 700° F., and is transferred through line 10 to a low point in a suitable scrubbing vessel, illustrated in the drawing by spray chamber 11. In this vessel the reaction product is neutralized with an alkali in order to convert organic acids present into their corresponding salts, thus effecting separation between organic acids and other oxygenated organic compounds for subsequent acid recovery in the process hereinafter described. Alkali thus employed may be either in aqueous solution or in the dry state. Furthermore, in addition to water, such alkalis may be employed while present in any suitable carrying medium, such as an alcohol, a hydrocarbon or individual mixtures thereof. It should be noted that in this respect we may successfully employ compounds comprising an alkali earth or an alkali metal, and particularly prefer to use alkali carbonates as the alkaline agent rather than other alkalis such as sodium hydroxide, inasmuch as alkali carbonates will not absorb carbon dioxide from the product gas in the process hereinafter described. The relatively lower cost of alkali carbonates as compared to other alkalis such as sodium hydroxide, makes its use more attractive from an economic standpoint. Alkali thus employed is introduced into chamber 11 through line 12 in quantities sufficient to effect complete conversion of organic acids present into their corresponding salts.

The aforementioned conversion of organic acids into their corresponding salts is carried out in chamber 11 at a temperature above the point of condensation of normally liquid components present in the reaction mixture. However it should be noted that chamber 11 must not be operated at a temperature so high that decomposition of the resulting alkali salts of organic acids, will take place. The alkali salts thus formed and separated in chamber 11 are withdrawn in an anhydrous state as an extract through line 13, for further treatment in the process hereinafter described. The remaining acid-free reaction mixture is withdrawn as a gas through line 14. This acid-free gas comprises a mixture of the aforementioned hydrocarbons and acid-free oxygenated organic compounds initially present in the reaction mixture entering chamber 11 through line 10. The vaporized mixture of hydrocarbons, water and acid-free oxygenated organic compounds is next cooled to condense substantially all normally liquid components. Conveniently, condensation may be effected in a plurality of cooling stages which are represented diagrammatically in the drawing by cooler 15, with which line 14 connects. From cooler 15 the mixture of condensate and uncondensed gas is transferred through line 16 to a separator 17. In separator 17 uncondensed gases, comprising relatively light hydrocarbons and oxygenated organic compounds, are withdrawn through line 18 for further use or treatment outside the scope of the present process. The condensate in separator 17 separates as an upper oil phase and a lower aqueous phase.

The upper oil phase from separator 17 comprises substantially all of the relatively heavy hydrocarbons and a major proportion of the relatively heavy oxygenated organic compounds initially present in the reaction mixture in line 10, and is withdrawn through line 19. The lower aqueous phase from separator 17, comprises substantially all of the remainder of the oxygenated organic compounds having a relatively low molecular weight and is withdrawn as bottoms through line 20. Both phases may be separately subjected to further use or treatment outside the scope of the present process.

As described above, the extract from chamber 11, comprising anhydrous alkali salts of the aforementioned organic acids, is withdrawn through line 13. These salts are transferred by gravity through line 13 to a mixer 21. Mixer 21 is provided to intimately mix the alkali salts, introduced through line 13, with an inorganic acid which is introduced into line 13 through line 22, with which line 13 connects, in order to effect complete regeneration of the organic acids from their salts. The inorganic acid thus introduced into mixer 21, may be a high boiling inorganic acid having a boiling point higher than that of water, such as sulfuric acid, or an inorganic acid which forms a maximum boiling azeotrope with water, such as hydrochloric acid. Any quantities of alkali carbonate present in line 13, formed by the reaction of alkali with carbon dioxide in chamber 11 (in instances where alkali treating agents other than alkali carbonates are used), will upon neutralization in mixer 21, regenerate carbon dioxide as a gas. Carbon dioxide thus regenerated, is withdrawn from a mixer 21 through line 23, for further use or treatment outside the scope of the present process.

The resulting aqueous mixture from mixer 21, comprises free organic acids and alkali salts of the introduced inorganic acid. This mixture is withdrawn from mixer 21, through line 24, and transferred to a separator 25. In separator 25, heavier organic acids present, will separate from the water solution by reason of their insolubility. These acids, comprising an upper acid-rich phase, are withdrawn overhead from separator 25 through line 26 and may be subjected to further treatment outside the scope of the present process, to obtain separation of individual acids where so desired.

The lower water-rich phase, which is formed in separator 25, comprises inorganic salts and lighter water-soluble organic acids, and is withdrawn as bottoms from separator 25 through line 27. This water-rich phase is next transferred through line 27 to a suitable point in a distillation tower 28, which functions as an acid stripper. Tower 28 is heated under conditions effective to distill overhead the aforementioned light organic acids as their water-azeotropes, other than acetic acid, which are withdrawn through line 29 and may be subjected to further treatment, outside the scope of the present process, to obtain separation of individual acids where so desired. Bottoms from tower 28, comprising inorganic salts, excess quantities of the introduced inorganic acid, any quantities of acetic acid that may be present, and water are withdrawn through line 30 for further use or treatment outside the scope of the present process.

It should be noted that it is possible to combine the aforementioned overheads from tower 28 in line 29, comprising water-soluble light organic acids as their water-azeotropes, with the heavier water-insoluble organic acids, comprising the upper acid-rich phase from separator 25 in line 26, with which line 29 connects. The streams thus combined may be next subjected to further treatment, to obtain separation of individual acids where so desired. In addition, separation of the aforementioned water-soluble organic acids, present in the lower water-rich phase formed in separator 25 and withdrawn through line 27, may be effected by extraction processes known to those skilled in the art, instead of by distillation as described above, in order to obtain separation of acetic acid together with the aforementioned water-soluble organic acids, from inorganic salts, excess quantities of the introduced inorganic acid, and water.

As described above, the present invention is directed to an improved process for the separation of organic acids from mixtures thereof with other oxygenated organic compounds and hydrocarbons present in the reaction mixture obtained in the catalytic hydrogenation of oxides of carbon at elevated temperatures, where such oxygenated compounds comprise alcohols, aldehydes, ketones and esters, in addition to fatty organic acids. However, while the invention has been described as having a particular applicability to the separation of such compounds obtained from the source indicated, it should be noted that the process of the invention is not necessarily restricted to effect the desired separation of these compounds as derived from the aforementioned source. The process of the invention may be also successfully applied to the separation of any mixtures of the aforementioned compounds, in whole or in part, without regard to the source from which these mixtures may have been derived and without regard to the relative proportions of the components comprising such mixtures.

In addition while we have described a particular embodiment of our invention for purposes of illustration, it should be understood that various modifications and adaptations thereof, which will be obvious to one skilled in the art, may be made within the spirit of the invention as set forth in the appended claims.

Having thus described our invention, what we claim and desire to secure by Letters Patent is:

1. A process for treating the total reaction product obtained in the hydrogenation of oxides of carbon which comprises subjecting said total reaction product in the vapor state without prior condensation to scrubbing treatment with an alkali at a temperature above the point of condensation of normally liquid components contained in said product to obtain an extract comprising salts of fatty organic acids and an acid-free gas comprising the remainder of said product, and separating said salts from said acid-free gas.

2. A process for treating the total reaction product obtained in the hydrogenation of oxides of carbon, wherein said product comprises a mixture of hydrocarbons, organic acids and other oxygenated organic compounds which comprises subjecting said total reaction product in the vapor state without prior condensation to scrubbing treatment with an alkali at a temperature above the point of condensation of normally liquid components contained in said product to obtain an extract comprising salts of said organic acids and an acid-free gas comprising the remainder of said product, and separating said salts from said acid-free gas.

3. A process for treating the total reaction product obtained in the hydrogenation of oxides of carbon, wherein said product comprises a mixture of hydrocarbons, organic acids and other oxygenated organic compounds which comprises subjecting said total reaction product in the vapor state without prior condensation at a temperature within the range from about 300° F. to about 700° F. to scrubbing treatment with an alkali at a temperature above the point of condensation of normally liquid components contained in said product to obtain an extract comprising salts of said organic acids and an acid-free gas comprising the remainder of said product, and separating said salts from said acid-free gas.

4. A process for treating the total reaction product obtained in the hydrogenation of oxides of carbon, wherein said product comprises a mixture of hydrocarbons, organic acids and other oxygenated organic compounds which comprises passing said total reaction product in the vapor state without prior condensation at a temperature within the range from about 300° F. to about 700° F. into a scrubbing zone, scrubbing said reaction product in said zone with an alkali at a temperature above the point of condensation of normally liquid components contained in said product to obtain an extract comprising anhydrous salts of said organic acids and an acid-free gas comprising the remainder of said product, and separating said salts from said acid-free gas.

5. A process for treating the total reaction product obtained in the hydrogenation of oxides of carbon, wherein said product comprises a mixture of hydrocarbons, organic acids and other oxygenated organic compounds which comprises passing said total reaction product in the vapor state without prior condensation at a temperature within the range from about 300° F. to about 700° F. into a scrubbing zone, scrubbing said reaction product in said zone with an alkali at a temperature above the point of condensation of normally liquid components contained in said product to obtain an extract comprising anhydrous salts of said organic acids and an acid-free gas comprising the remainder of said product, separating said salts from said acid-free gas, acidifying said salts with an inorganic acid, separating the mixture thus obtained into an acid-rich phase comprising water-insoluble organic acids and a water-rich phase comprising inorganic salts and water-soluble organic acids, separating said phases, and separating water-soluble organic acids from inorganic salts in said water-rich phase.

6. A process for treating the total reaction product obtained in the hydrogenation of oxides of carbon, wherein said product comprises a mixture of hydrocarbons, organic acids and other oxygenated organic compounds which comprises passing said total reaction product in the vapor state without prior condensation at a temperature within the range from about 300° F. to about 700° F. into a scrubbing zone, scrubbing said reaction product in said zone with an alkali carbonate at a temperature above the point of condensation of normally liquid components contained in said product to obtain an extract comprising anhydrous salts of said organic acids and an acid-free gas comprising the remainder of said product, separating said salts from said acid-free gas, acidifying said salts with an inorganic acid, separating the mixture thus obtained into an acid-rich phase comprising water-insoluble organic acids and a water-rich phase comprising inorganic salts and water-soluble organic acids, separating said phases, and separating water-soluble organic acids from inorganic salts in said water-rich phase.

7. The process as defined by claim 6 in which said inorganic acid is sulfuric acid.

8. The process as defined by claim 6 in which said inorganic acid is hydrochloric acid.

WILLIAM P. BURTON.
ERNEST SOLOMON.

REFERENCES CITED

The following references are of record in the file of this patent:

UNITED STATES PATENTS

| Number | Name | Date |
|---|---|---|
| 2,171,324 | Zetzsche et al. | Aug. 29, 1939 |
| 2,274,632 | Owen | Mar. 3, 1942 |
| 2,274,750 | Soenksen et al. | Mar. 3, 1942 |
| 2,287,123 | Pirkle | June 23, 1942 |
| 2,470,782 | McGrath et al. | May 24, 1946 |
| 2,472,837 | King | June 14, 1949 |

FOREIGN PATENTS

| Number | Country | Date |
|---|---|---|
| 350,502 | Great Britain | June 15, 1931 |
| 446,305 | Great Britain | Apr. 28, 1936 |
| 92,258 | Sweden | Mar. 10, 1938 |

OTHER REFERENCES

Koch et al.: Brem. Chem. 16, 382–387.

Fischer: "Conversion of Coal Into Oils," pages 242–5.